United States Patent
Kersch et al.

[15] 3,690,159
[45] Sept. 12, 1972

[54] HOLOGRAPHIC INTERFEROMETRY EMPLOYING IMAGE PLANE HOLOGRAMS

[72] Inventors: Leonard A. Kersch; Edwin B. Champagne, both of Ann Arbor, Mich.

[73] Assignee: GC Optronics, Inc., Ann Arbor, Mich.

[22] Filed: April 29, 1970

[21] Appl. No.: 32,941

[52] U.S. Cl. .................73/88 A, 73/15.6, 73/71.3, 350/3.5, 356/32, 356/109
[51] Int. Cl. ..................G01b 11/16, G01n 3/18
[58] Field of Search.......73/67.5 H, 71.3, 15.6, 88 A; 350/3.5; 356/106, 109, 113, 32

[56] References Cited

OTHER PUBLICATIONS

Hologram Interferometry, Stetson et al. J. O. S. A. Vol. 56, No. 9, September 1966, pg. 1161–1166.
Holographic Multiple- Beam Interferometry, Matsumoto J.O.S.A. Vol. 59, No. 6, June 1969, pg. 777–779
Focused-Image Holography with Extended Sources, Rosen Applied Physics Letters, Vol. 9, No. 9, Nov. 1, 1966 pg. 337–339
Hologram Interferometry Using Two Reference Beams, Tsuruta et al., Japanese Journal of Applied Physics, Sept. 1968, pg. 1092–1100
Double-Exposure Holographic Interferometry with Separate Reference Beams, Ballard, Journal of Applied Physics, Vol. 39, No. 10; September 1968, pg. 4846–4848

*Primary Examiner*—Richard C. Queisser
*Assistant Examiner*—John P. Beauchamp
*Attorney*—McGlynn, Reising, Milton & Ethington

[57] ABSTRACT

A hologram of a test specimen is formed in an optical arrangement including a lens which focuses coherent light reflected by the object onto a photographic plate. A real-time interferometric analysis of the deformation of the object as a result of loading is made using the resulting image-plane hologram. The interference fringe frequency in particular area resulting from gross deformation of the object is decreased to allow the detection of fringe anomalies in that area by suitable translations of the hologram relative to the reconstruction beam.

In an alternate embodiment, a pair of image-plane holograms of the object at two states of loading are formed on the same photographic plate by a double-exposure technique using reference beams which bear different angles to the photographic plates during the two exposures. To reconstruct the holograms a pair of reconstruction beams are employed and motion of the beams relative to one another allows the fringe frequency on various areas of the object to be modified.

11 Claims, 7 Drawing Figures

INVENTORS
Edwin B. Champagne,
Leonard Kersch
BY
Barnard, McGlynn & Reising
ATTORNEYS INVENTORS
Edwin B. Champagne,
Leonard Kersch
BY Barnard, McGlynn & Reising
ATTORNEYS

HOLOGRAPHIC INTERFEROMETRY EMPLOYING IMAGE PLANE HOLOGRAMS

BACKGROUND OF THE INVENTION

1. Field of the Invention

This invention relates to methods of nondestructively testing objects by comparing their surface profiles before and after stressing with holographic interferometry to detect localized deformation anomalies, and to make quantitative deformation measurements and more particularly to techniques which allow the fringe pattern obtained in the interferometric process to be modified to compensate for gross deformations of the object and to subject particular areas of the object to detailed examination.

2. Prior Art

Holography involves the recording and reconstruction of light wavefronts by photographically recording the interference pattern between coherent light reflected from a scene or object and a reference wavefront of coherent light from the same source that illuminated the scene or object. After development and fixing, the resulting "hologram" may be used to reconstruct the original reflected light wavefront by illuminating the hologram with an appropriate light source, usually coherent. The development of the laser as a source of highly coherent light has spurred the development of holography in the last few years. "Holographic Interferometry" is a technique which employs a wavefront system reconstructed from a hologram to detect minute deformations on the surface of an object. In "real-time" analysis the reconstructed wavefront, representing an object at a first time, is superimposed on a wavefront reflected from the object at a second time while the object is illuminated with light that is coherent with that used in the reconstruction. In "double-exposure" holographic interferometry, wavefronts of the object at two separate times are both recorded on the same photographic plate, so that they may be simultaneously reconstructed in the superimposed manner.

In both techniques minute deformations of the object resulting from movements between the times of the formation of the two wavefronts are revealed in the form of fringe lines which are visible on the superimposed reconstruction. These fringe lines generally are arrayed somewhat as contours of equal displacement of the surface of the object between the two times under consideration. If the entire object translates normally to the line of vision of the observer viewing the reconstruction through the hologram, almost no fringe line array will be noted, (absolutely no fringe array will be noted if the wavefronts were planar rather than curvalinear) although the total surface of the image may appear brightened or darkened. If the object has been rotated about an axis parallel to the hologram between the two times under consideration, a relatively uniform array of fringe lines will appear on the interferometric reconstruction.

Holographic interferometry has been successfully employed to nondestructively test a variety of forms of workpieces by stressing them in some way between the times of the two wavefronts and then detecting anomalies in the deformation pattern which is revealed by the interferometric analysis. For example, separations between the carcass and plies of a tire may be detected by inflating the tire and performing an interferometric analysis of the surface of the tire two times shortly after inflation. Following inflation the tire will deform for some time as a result of creep of the rubber and sections of the surface overlying a separation will tend to creep at a different rate than the balance of the tire. Accordingly, a holographic interferometric analysis made at two times after inflation will reveal such separations.

The fringe lines which occur in holographic interferometric analysis represent increments in the surface deformation of the object between the times of formation of the two wavefronts, and their spacing is a function of the wavelength of the coherent light employed in the analysis. If a section of the surface moves through a distance which is gross compared to this wavelength, a high fringe density results making it difficult to detect anomalies in the motion pattern. The present invention has as its prime object to provide a method of real-time and double-exposure holographic interferometric analysis which compensates for gross deformation of the object of the type which might cause high fringe densities so as to allow the detection and analysis of anomalies in these grossly deformed areas.

At the present state of the art of holographic interferometry, one of the advantages of real-time techniques over the double-exposure variety is the ability to modify the illumination direction or otherwise modify the test setup, in real time, to achieve optimal conditions for detecting suspected anomalous areas. An object of the present invention is to provide a method wherein the manner in which a double-exposure hologram is reconstructed may be modified to provide similar detailed analysis of various sections of the workpiece.

SUMMARY OF THE PRESENT INVENTION

The present invention contemplates novel processes of both real-time and double-exposure holographic interferometry. The holograms used in both of these techniques differ from conventional holograms in that a lens or lens system is disposed between the object and the photographic plate so as to focus an image of the object on the plate much in the manner of conventional photography. In the more conventional holography the object is not imaged on the photographic plate but rather every point on the photographic plate is exposed to lightwaves reflected from every point on the object which may be connected with that point on the photographic plate by a straight line. In essence, the present "image-plane" holograms do not record the light waves emanating from the object but rather record the light wavefronts emanating from the system consisting of the object and the lens. Upon reconstruction the same image of the object is seen as would be seen through the lens. Such an image-plane hologram is a hybrid between a conventional hologram and a conventional photograph and exhibits certain properties of each. With a conventional hologram the wavefronts produced on reconstruction will be a distorted version of the original wavefronts if the angle of the reconstructing beam with respect to the hologram differs from the angle that the reference beam bore to the photographic plate during the formation of the hologram. Of course, in a conventional photograph no particular angular relation between the photograph and the illuminating light source may be observed. The image-plane hologram resembles the conventional photograph in this property. Since the reconstructed image occurs in the plane of the hologram plate, by varying the angle of the hologram with respect to the reconstruction light source, the position of the reconstructed image changes but its proportions do not become distorted.

In the simplest embodiment of the present invention an image-plane hologram is formed of an object and later distortion of the visible surface of the object is measured by reconstructing the original image from the hologram and superimposing it upon the actual image of the object as seen in real time. With the hologram in exactly the same position as the photographic plate occupied during formation of the hologram, the image seen through the hologram will appear with fringe lines superimposed thereon resulting from the interference between the two images. These fringe lines will be the result of the deformation of the object during the time since the formation of the original hologram. Certain deformations may produce such high fringe densities in localized areas as to make it difficult to analyze the deformation in those areas. In order to modify localized fringe density it is only necessary to move the reconstruction beam. This motion will adjust the phase of the reconstructed wavefront relative to the wavefront emanating from the object in real time. If the original object has undergone an overall translation since the time of formation of the hologram, all fringes resulting from this translation can be eliminated from the analysis image by a motion of the reconstructing wavefront. If the object has been locally deformed so as to produce a high fringe density in particular areas, making detailed analysis of the deformation of theses areas difficult, the overall fringe density in these areas may be decreased by a suitable motion of the hologram relative to the reconstructing beam, allowing anomalies in the deformation pattern to be made visible and thus detectable. This motion may simultaneously increase the fringe frequency in other areas of the object.

This technique makes use of the previously noted fact that a rotation of an image-plane hologram with respect to the reconstructing light beam does not distort the reconstructed wavefront but only modifies its proportions relative to the axis of viewing in the same manner as if a photograph were rotated with respect to its viewing axis. With a normal hologram, the motion of the hologram would produce a distortion of the reconstructed wavefront which would make meaningful analysis extremely difficult.

The method of the present invention may also be applied to double-exposure holography by superimposing two holograms of an object formed at spaced times, on the same plate using reference beams to form the two holograms which bear different angles with respect to the photographic plate. Upon reconstruction, using separate reconstructing beams corresponding to the separate reference beams, the alignment of the two reconstructed wavefronts relative to one another may be adjusted by moving one of the reconstructing beams relative to the other. This technique again allows for the modification of the overall fringe density in selected areas of the object so as to allow for the detailed inspection of particular areas and the removal of fringe patterns resulting from overall motion. Were a single reference beam used in both of the exposures, the later motion of the reconstruction beam relative to the hologram would modify the two reconstructed wavefronts equally, making it impossible to modify the spatial frequency of the fringes in any selected area.

This double-exposure technique is particularly valuable in production situations since it allows a single double-exposure hologram to be formed of a large area relatively quickly and allows a later detailed examination of selected points within that area without requiring the presence of the actual object. This double-exposure technique also makes use of the fact that the wavefronts reconstructed from an image-plane hologram are not distorted by a modification of the angle between the hologram and the reconstructing beam.

Other objects, advantages and applications of the present invention will be made apparent by the following detailed description of two preferred embodiments of the invention. The description makes reference to the accompanying drawings in which.

Figure 1:
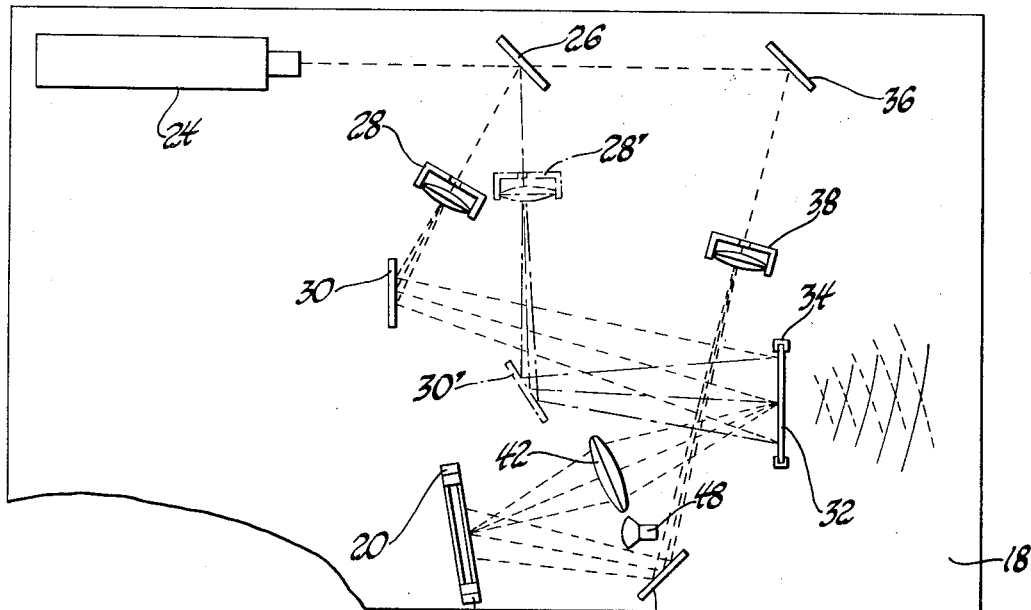
FIG. 1 is a plan view of optical apparatus for forming a hologram of an object and reconstructing a wavefront from that hologram so that it is superimposed on the wavefronts emanating from the object in real time at a later time, useful in the practice of a first embodiment of the invention.
Figure 2:
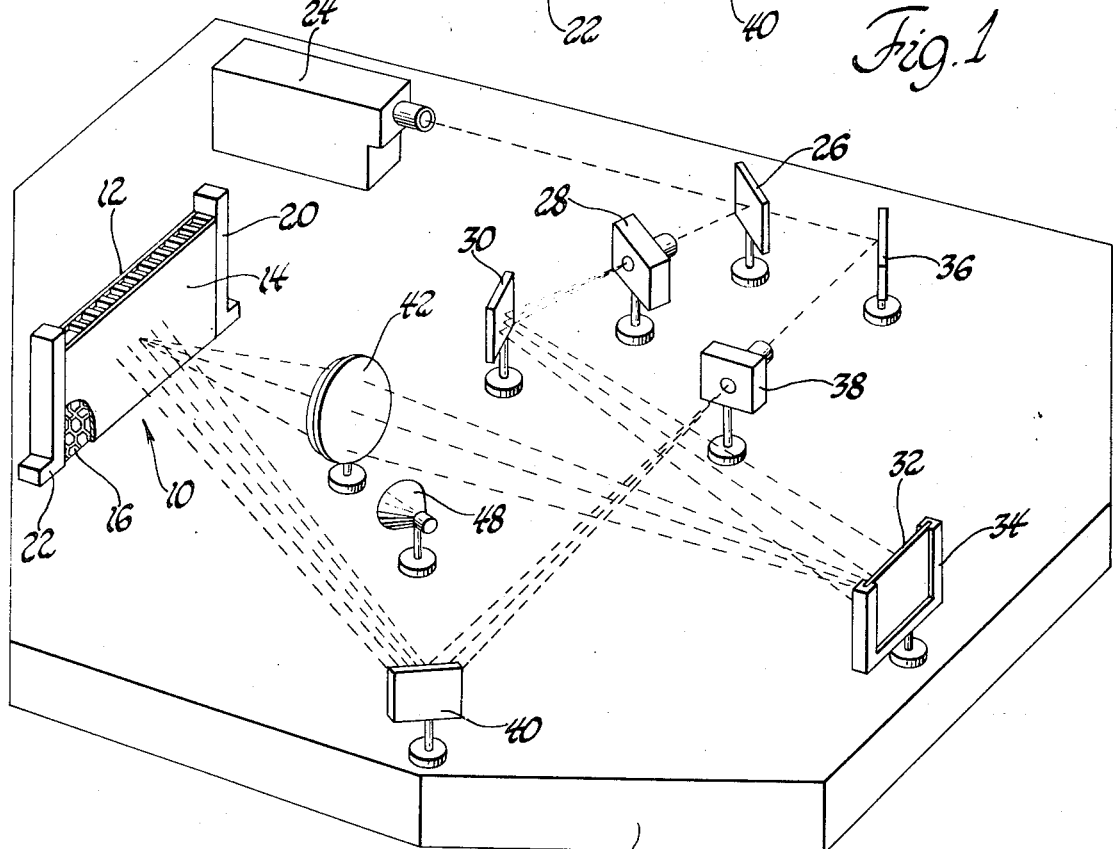
FIG. 2 is a perspective view of the apparatus of FIG. 1.

The application of the present invention to real-time holographic interferometric analysis preferably employs apparatus of the type illustrated in FIGS. 1 and 2. The apparatus is illustrated as performing an interferometric analysis on a plane section of honeycomb 10 which includes a pair of thin metal skin sheets 12 and 14 joined together by central honeycomb core 16 projecting normally to the sheets. (This type of material is employed in aircraft structures). A section of the skin sheet 14 is shown broken away in the lower left-hand corner to illustrate the core 16.

This test specimen 10, as well as the other apparatus used in the practice of the invention, is supported on a heavy iron plate 18 which is suitably isolated from vibration in accordance with conventional holographic practice. The test specimen 10 is retained on the base plate 18 by a pair of upright members 20 and 22 which abut its side edges so as to prevent any lateral dimensional expansion.

The coherent light used to perform the holographic analysis is derived from a laser 24 which projects its beam to a half-silvered mirror 26 acting as a beam splitter, to form a pair of beams which are coherent with respect to one another. One of the beams is passed through a spatial filter 28, comprising a lens and pinhole assembly operating to eliminate the spread edges of the beam and to form the beam into a diverging pattern. The beam is then reflected by a mirror 30 to a photographic plate 32 which is retained in a plate holder 34, where it acts as the reference beam in the formation of the hologram. The other beam from the half-silvered mirror 26 is reflected by a mirror 36 through a spatial filter 38 and is then reflected by a mirror 40 so as to project it upon that surface of the workpiece 10 which is opposed to the photographic plate 32. A certain portion of the light reflected from the workpiece reaches an imaging lens 42 which has a focal distance such as to focus the illuminated surface of the workpiece 10 on to the plate 32.

Utilizing a photographic film of suitable sensitivity and grain size, and exposure times which are now well-known to those who practice holography, the photographic plate 32 is exposed to record the interference pattern between the reference beam reflected from the mirror 30 and the object beam produced by the lens 42. Upon suitable development of the photographic plate, which may either be performed in a situ or at a remote location, a hologram is formed from which the wavefronts reaching the photographic plate 32 from the lens 42, during the exposure process, may be reconstructed.

The hologram thus formed is conventional in the sense that the object wavefront may be reconstructed from it, but is unconventional in that the object being reconstructed constitutes a wavefront containing the image of the ultimate object 10 as focused by the lens 42. Were the lens 42 to be removed from the system, every point on the object 10 facing the photographic light would reflect to every point on the photographic plate. The lens 42 focuses the beam on the plate 32 so that there is a one-to-one correspondence between the points on the illuminated surface of the object 10 and the surface of the photographic plate 32 illuminated by the object beam. Such an "image-plane hologram" has previously been known to the art but not as part of the present invention.

The developed hologram may be reinserted in the plate holder 34 in the same position previously occupied by the photographic plate. With the object in exactly the same position as previously, the light wavefronts forming the reconstructed image of the object will coincide with those wavefronts actually emanating from the object in real time, and only one object will be observed by an observer looking through the hologram from the right side of the plate as viewed in FIGS. 1 and 2. If the object has been grossly displaced since the time that the original hologram was formed, such as by a movement through one-half inch, dual images of the object, not exactly superimposed, will be seen through the hologram.

If, however, sections of the object have been deformed through relatively small distances, such as 0.0001 inch, as might be caused by a change in ambient temperature inducing thermal stresses in the object, only a single object will be observed but it will appear to contain fringe lines which are the result of the interference between the real-time and the reconstructed light wavefronts. The lines in FIG. 1 to the right of the plate holder 34 illustrate the manner in which the reconstructed wavefronts 46 and the real-time wavefronts 46' interfere by reason of a motion of the workpiece between the time of formation of the original hologram and the later reconstruction. The angles shown in FIG. 1 are purposely exaggerated for better illustration.

In order to test some property of the object 10, such as the bond between the skin 14 and the core 16, the workpiece 10 may be purposely stressed during the time between the formation of the original hologram and the later real-time viewing. This might be done by a heat lamp 48 which projects its beam on the face of the workpiece 10. The resultant heating causes an expansion of the skin 14 which causes it to pull away from the core 16. This deformation caused by the heating will result in overall displacement of the object 10 but will also result in anomalous displacement of any sections of the skin 14 adjacent to areas which are not firmly adhered to the core 60. In this manner the bond between the skin and the core may be tested.

Figure 3:
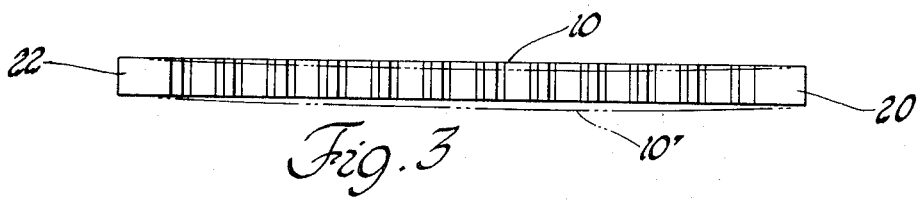
FIG. 3 is a plan view of an object which may be tested with the apparatus of FIG. 1 and 2, illustrating a deformation of the object.

A difficulty encountered in this test procedure is that the fringes resulting from overall deformation of the workpiece 10 act to mask the localized deformation anomalies resulting from poor bonds. FIG. 3 illustrates the overall deformation which might occur in the object as a result of the heating by the lamp 48. Because of the restraint imposed by the uprights 20 and 22, the expansion of the honeycomb from the heating may cause it to bow to the position 10'.

Figure 4:
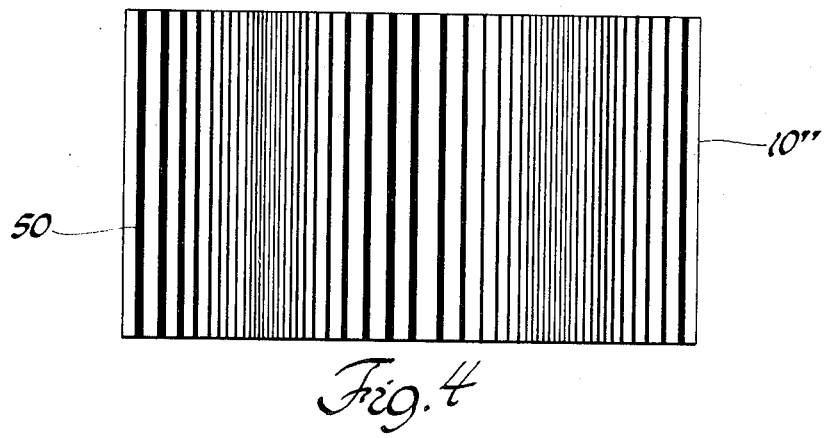
FIG. 4 is an illustration of the interference fringes which would occur on the image of the object of FIG. 3 during real-time analysis in absence of the practice of the method of the present invention.

FIG. 4 illustrates the fringe families that might be visible on the superimposed reconstructed and real-time wavefronts in the real-time analysis process on the reconstructed image of the workpiece 10''. The bowing of the workpiece 10 has been assumed to be uniform along vertical lines for purposes of this illustration. The fringes have a spatial frequency which is a function of the slop of the workpiece with respect to its original plane configuration. Since the ends are constrained they exhibit relatively low spatial frequencies, and the middle is largely translated so it exhibits a low spatial frequency, but high spatial frequencies occur in two bands disposed between the middle and the two ends. This overall fringe pattern may mask anomalies in the deformation pattern which occur in the areas of high fringe frequency.

Figure 5:
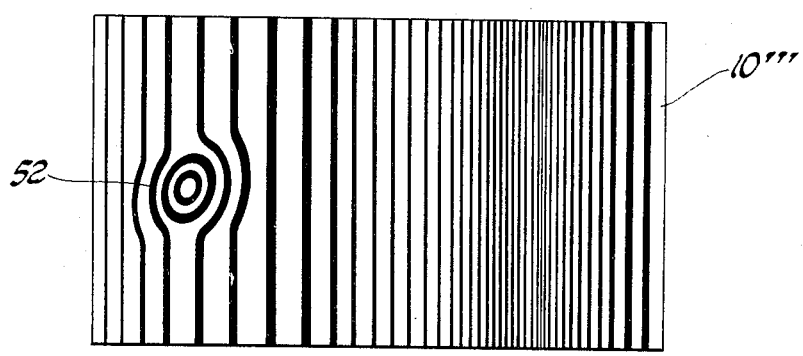
FIG. 5 is an illustration of the fringes which appear on the image of the object of FIG. 3 using the method of the present invention to decrease the fringe frequency on the left side of the object.

In order to more carefully examine the area of the workpiece 10 in the vicinity of the fringe band of high density to the left of FIG. 4, the angle which the reconstructing beam makes with the hologram may be altered by moving the components 28 and 30 to positions 28' and 30' as shown in FIG. 1. Alternatively, the angle that the object beam makes with the workpiece might be altered by an appropriate motion of the mirror 40. Other changes could be made by moving the spatial filters 28 or 38 so as to change the apparent sources of their beams. The effect of such motions will be to shift the reconstructed wavefronts relative to the real-time wavefronts in such a manner as to bring their overall slope into alignment at the area on the left of the workpiece. As illustrated in FIG. 5, this decreases the spatial frequency in that area, as seen on the resultant image 10'''', and reveals an anomaly 52 in the fringe pattern which results from a disbond between the skin 14 and the core 16 in the area of the anomaly. At the same time the fringes to the right of the image have become even more closely spaced.

Figure 6:
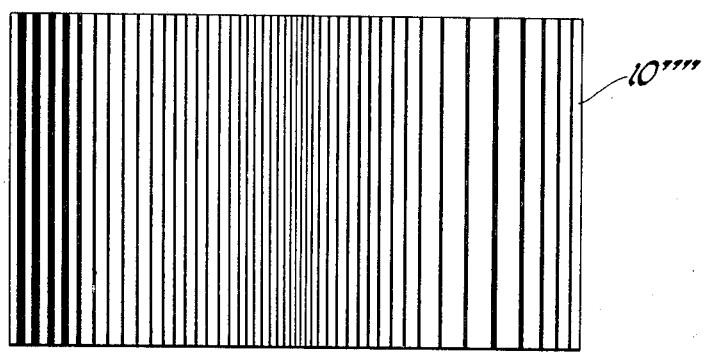
FIG. 6 is an illustration of the fringes which appear on the image of the object using the method of the present invention to decrease the fringe frequency on the right side of the object.

The area to the right of the image may be viewed in a more intensive manner by displacing the reconstructing beam in the opposite direction so as to decrease the overall spatial frequency on the right in the manner shown in FIG. 6 on image 10''''. This examination reveals no fringe anomaly.

Had these displacements of the reconstructing beam been made using a conventional hologram as opposed to an image-plane hologram, the resultant distortion of the reconstructed wavefronts would have made analysis impossible after movement of the reconstructing beam from the position it occupied during the formation of the hologram.

Figure 7:
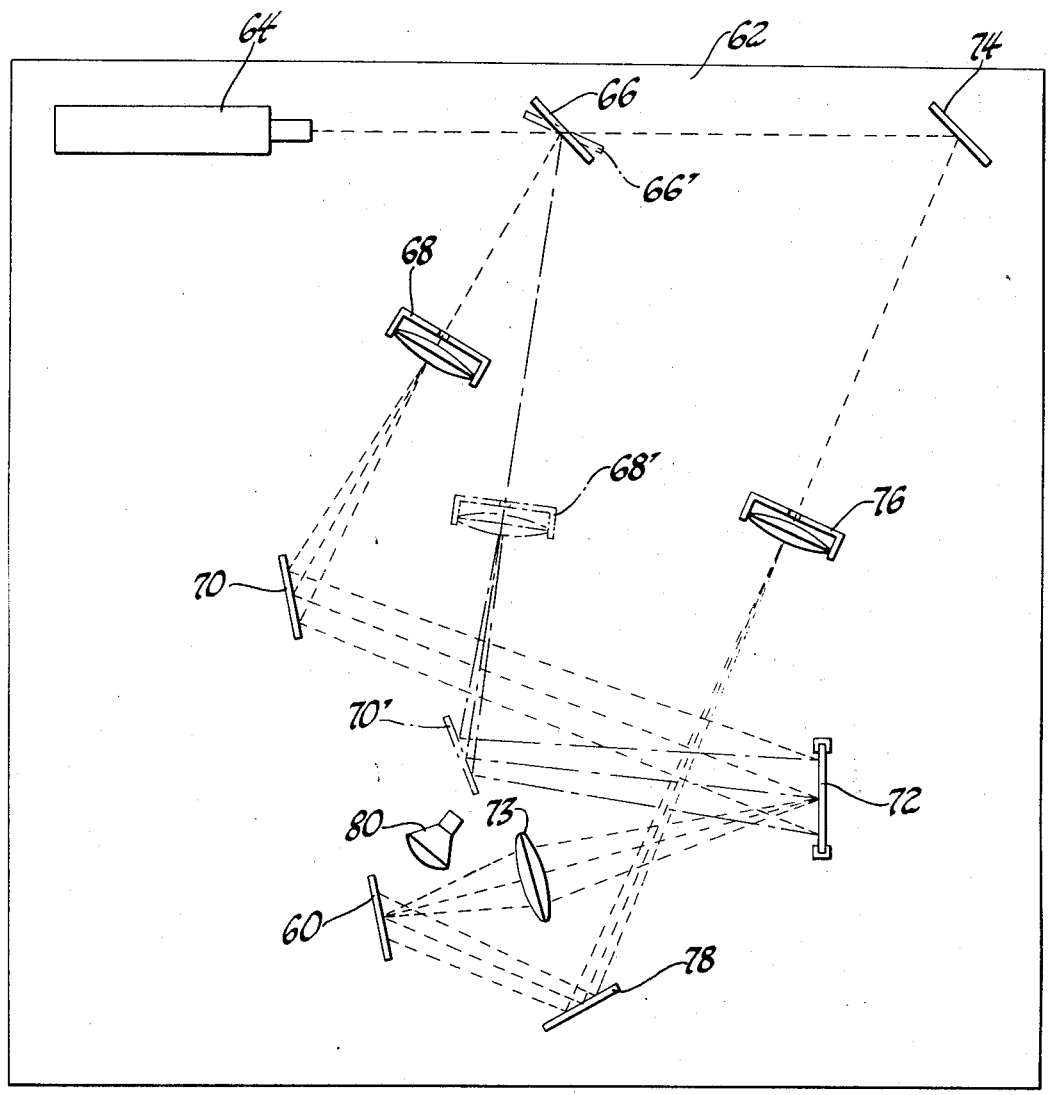
FIG. 7 is a plan view of apparatus for practicing a second embodiment of the invention involving double-exposure holography.

The manner in which the present invention may be utilized with a double-exposure technique is illustrated in FIG. 7. To make a double-exposure holographic interferometric analysis of a workpiece 60, supported on a table 62, a laser 64 provides a coherent beam to a beam splitter 66 which divides it into a reference beam that passes through a spatial filter 68 and is reflected by mirror 70 to a photographic plate 72. The other beam from the splitter is reflected by mirror 74, through a spatial filter 76, and by a mirror 78 to the object 60. A lens 73 forms an image-plane hologram of the object on the plate 72.

After the workpiece 60 is stressed, as by heat from the lamp 80, a second exposure of the same photographic plate is made. In this exposure the position of the reference beam is changed by moving the mirror 66, the spatial filter 68 and the mirror 70 to positions 66', 68' and 70' respectively. In practice the shift in position of the reference beam between the two exposures of the photographic plate might be better achieved by providing two sets of mirrors and spatial filters for the reference beam and suitable shuttering so that the first set is used for the first exposure and the other set with the second exposure. In either event, a second exposure of the photographic plate 72 is made, after the object is stressed, and using a reference beam having a shifted position with respect to the first reference beam.

After development of the hologram, reconstruction requires the use of two reconstructing beams which initially share the same relationship to one another and also to the hologram as the original reference beams. If the object has undergone no translation or deformation between the two exposures, only a single object will be viewed. Minor magnitude overall and anomalous deformations will result in fringes on the apparent reconstruction. The fringe frequency over selected areas of the image may then be controlled by displacing one of the reference beams with respect to the other in the same manner as is done in connection with the real-time version. This modifies the angle of the two reconstructed wavefronts with respect to one another without in any way distorting the reconstructed image since image-plane holograms are utilized.

This technique combines all the advantages of real-time and double-exposure holography.

Having thus described our invention, we claim:

1. The method of performing holographic interferometric analysis of the deformation of an object, comprising: forming an image-plane hologram of the object at a first time; deforming the object; reconstructing a first wavefront from said hologram using a first source of coherent light; superimposing a second wavefront originating from the object at a second time, after the deformation, on said first wavefront using a source of coherent light which is coherent with said first source; and altering the phase of the reconstructed wavefront relative to the second wavefront so as to modify the interference fringe density on the superimposed image, by moving the first source relative to the hologram.

2. The method of claim 1 wherein said second wavefront is formed in real time by light reflected from said object.

3. The method of performing holographic interferometric analysis of the deformation of an object, comprising: forming a pair of coincident image-plane holograms of the object at respective first and second times on a record media; deforming the object between said first and second times; reconstructing two wavefronts of the object from said hologram media using first and second reference beams; and altering the phase of one reconstructed wavefront relative to the second reconstructed wavefront so as to modify the interference fringe density on the resultant superimposed image by varying the angle of one of said reconstructing beams relative to the record media.

4. The method of claim 3 wherein the process of formation of the image-plane hologram employs a reference beam and the angle between the reference beam and the photographic media differs in the formation of the two holograms.

5. The method of performing holographic interferometric analysis, comprising: illuminating an object from a first coherent light source; forming a focused image of light reflected from said object on a photographic media; simultaneously illuminating said media with light coherent with said first light source so as to record an interference pattern between such coherent light and said image, on said media; developing said media to form a hologram; reconstructing a wavefront from said hologram employing coherent light from a source; deforming said object; superimposing on the wavefront reconstructed from said hologram a second wavefront consisting of light coherent with the reconstructing light source reflected from said object after said deformation; and modifying the angle of incidence of one of the reconstructing and second wavefront sources to adjust the phase of the reconstructed wavefront relative to the second wavefront.

6. The method of claim 5 wherein said second wavefront is generated by illuminating the object with the same light source which is used to reconstruct the wavefront from the hologram.

7. The method of performing holographic interferometric analysis, comprising: illuminating an object from a first coherent light source; forming a focused image of light reflected from said object on a photographic media; simultaneously illuminating said media with light coherent with said first light source so as to record an interference pattern between such coherent light and said image on said media; deforming said object; illuminating the object at a second time with a second light source coherent with said first light source; forming a second focused image of light reflected from said object on said photographic media superimposed on said first focused image; simultaneously illuminating said media with coherent light from said second source to record an interference pattern between such coherent light and said image on said media; developing said media to form a double exposure hologram; illuminating said hologram so as to reconstruct said first and second superimposed wavefronts; and modifying the manner of illumination of said hologram to adjust the phase of the first reconstructed wavefront relative to the second reconstructed wavefront by varying the angle of one of said reconstructing wavefronts relative to the photographic media.

8. The method of claim 7 wherein the two holograms were formed employing reference beams which made different angles with the photographic media, two reference beams are employed to reconstruct the two wavefronts and the position of the hologram relative to only one of the reference beams is varied in order to adjust the position of the two reconstructed wavefronts relative to one another.

9. The method of performing holographic interferometric analysis of the deformation of an object between two times, comprising: forming a first image plane hologram of the object at the first time on a photographic plate using a first reference beam making a first angle relative to said photographic plate; forming a second image plane hologram of the object at a second time on said photographic plate, so as to be superimposed on said first hologram, using a second reference beam making a second angle relative to said photographic plate; reconstructing the wavefronts emanating from the object the first and second times from said hologram plate through use of first and second reconstructing beams which form different angles relative to the hologram plate; and varying the angle of at least one of said reconstructing beams relative to the hologram plate in order to modify the interference fringe density on the resultant superimposed image.

10. The method of claim 9 wherein at least one of the reconstructing beams forms the same angle relative to the hologram plate as does one of the reference beams in the formation of the image plane holograms.

11. The method of claim 9 wherein lens means is employed between the object and the photographic plate during the formation of the first and second image plane holograms in order to focus an image of the object substantially at the plane of the photographic plate.

* * * * *